United States Patent
Weber

(10) Patent No.: US 6,778,079 B2
(45) Date of Patent: Aug. 17, 2004

(54) INPUT/OUTPUT METHODOLOGY FOR CONTROL RELIABLE INTERCONNECTION OF SAFETY LIGHT CURTAINS AND OTHER MACHINE SAFETY CONTROLS

(75) Inventor: Dane Weber, Coon Rapids, MN (US)

(73) Assignee: Banner Engineering, Minneapolis, MN (US)

( * ) Notice: Subject to any disclaimer, the term of this patent is extended or adjusted under 35 U.S.C. 154(b) by 0 days.

(21) Appl. No.: 09/858,790

(22) Filed: May 16, 2001

(65) Prior Publication Data

US 2002/0171554 A1 Nov. 21, 2002

(51) Int. Cl.⁷ .............................................. G08B 23/00
(52) U.S. Cl. ...................... 340/500; 340/500; 340/679; 340/680; 340/686.5; 340/507; 700/79; 700/83; 700/111
(58) Field of Search ................................ 340/500, 541, 340/679, 680, 686.5, 687, 506, 507, 532; 700/79, 80, 83, 111

(56) References Cited

U.S. PATENT DOCUMENTS

| 5,198,661 | A | * | 3/1993 | Anderson et al. | ............ 250/221 |
| 5,880,954 | A | * | 3/1999 | Thomson et al. | ............ 364/184 |
| 5,993,039 | A | * | 11/1999 | Crill | ............ 364/184 |
| 6,056,088 | A | * | 5/2000 | Gerstenkorn | ............ 187/390 |
| 6,201,997 | B1 | * | 3/2001 | Giers | ............ 700/79 |

OTHER PUBLICATIONS

"Photo–Electric Safety Systems," *Tapeswitch Corporation*, pp. 53–57.
"DuoSafe Controllers," *Scientific Technologies Inc*.
"Cost–effective protection of one or two zones," *Safescan 9*.
"GS 300 to FGS 1800 Safety Light Curtain (Grid Principal)" *Technical Description* pp. 2–17.
"FlexSafe," *STI Scientific Technologies GmbH*.
"Dual Mini–Screen Dual Safety Light Screen System Instruction Manual", *Banner Engineering* pp. 2–63.
"Multi–Screen System Dual Safety Light Screen System Instruction Manual," *Banner Engineering* pp. 2–67.

* cited by examiner

Primary Examiner—Jeffery Hofsass
Assistant Examiner—Daniel Previl
(74) Attorney, Agent, or Firm—Merchant & Gould P.C.

(57) ABSTRACT

The present invention involves a methodology for the interconnection of safety control modules used for the safeguarding of personnel around points and areas of hazardous machine operation. The system includes one or more safety control modules connected together so that the safety control modules communicate with each other using actively diverse safety control signals. The safety control modules are also connected to the machine safety control circuit so that the safety control modules can stop machine operation when one or more safety control modules are activated. The use of actively diverse safety control signals provides a control reliable system.

16 Claims, 8 Drawing Sheets

INPUT/OUTPUT METHODOLOGY FOR CONTROL RELIABLE INTERCONNECTION OF SAFETY LIGHT CURTAINS AND OTHER MACHINE SAFETY CONTROLS

TECHNICAL FIELD

This invention relates to the field of machine operation control. More specifically, this invention relates to a methodology for implementing a control reliable safety system for machine operation.

BACKGROUND OF THE INVENTION

Safety control modules are used for the safeguarding of personnel around points and areas of hazardous machine operation. Examples of hazardous machines include punch presses, press brakes, automation work cells (including robot cells), molding presses, and the like. Often times the machine and/or cell application requires multiple safety controls to guard and control the machine safely. Multiple light curtains, E-Stop switches, gate switches, safety mats etc. are used with the machine safety control circuit to provide safe and efficient machine operation. Typically, many of the safety controls are functionally connected in series to form safety control signals to various parts of the machine control circuit. Interconnection of these safety controls often introduces wiring faults that can lead to the loss of the safety control signals.

"Control Reliability" is a method of ensuring the integrity of performance of control systems, including guards and safeguarding devices that interface with the control system. In order to be control reliable, an interconnection methodology cannot allow the loss of any safety control signal when any single fault of any part of the machine safety control system occurs, including the wiring. Furthermore, the interconnection methodology cannot allow the loss of any safety control signal due to single faults that are undetected and combined with additional faults. In the past, unique solutions have been developed for each specific functional safety control. Solutions for multiple safety light curtains were different compared to multiple E-Stop switches, gate switches, safety mats, etc. Often times, these different methods produced different levels of safety integrity (i.e. not all methods were control reliable). The inconsistency of wiring solutions also has resulted in confusion, poor field reliability, excessive circuit wiring, special dedicated control components and high system costs. An approach is needed that provides a consistent, control reliable, simplified, low system cost solution using standard safety control modules.

Currently, safety control modules are designed and sold individually and without knowledge of the machine safety control circuit. This limits the safety control module engineers in their ability to provide products that form a control reliable machine safety control system when connected together. Simply using control reliable safety control modules is not enough. The machine safety control system must be interconnected in a control reliable manner so that wiring faults of the system result in control reliable machine operation. Machine safety control systems are developed and modified by different people at different times over the life of the machine. The manufacturer may develop an initial machine safety control system that is modified by the installer of the machine at the customer site. Over the life of the machine the setup of the machine changes to accommodate various production assignments. Machines may be sold, recommissioned or rebuilt to perform other production tasks. This presents many opportunities for the machine safety control system to be modified.

Because each safety control module has been independently designed (often times by different manufacturers) without taking into account the overall control reliability of the machine safety control circuit, there is a lack of overall system designs including a hybrid of safetycontrol modules. For example, safety light curtains have addressed connecting multiple safety light curtains by the following methods:

- independent safety light curtain systems with isolated output contacts connected to the machine control circuit. Monitoring and detecting wiring faults is very difficult to achieve due to signals that are not unique.
- special safety control modules that operate more than one safety light curtain sensor pair. These systems are limited in how many sensor pairs can be connected (see, e.g., the Banner Multi-Screen System Dual Safety Light Screen System control box MUSC-1).
- special systems that break up the sensors into pieces that are connected by special cables that allow the control unit to treat the pieces as one sensor pair, as described in U.S. Pat. No. 5,198,661. Response time for these systems is increased because all of the sensor pairs are in series and treated as one sensor. Ordering and stocking of the special sensors (first segment, middle segment, end segment), and the special interconnecting cables are cumbersome and undesirable. The individual segments cannot be used alone. They must be pieced together to make a working system. The diagnostics are combined so it is more difficult to determine which segment or cable is faulty and in need of replacement.
- mechanically configured sensors such as hinged or fixed special (T or L) shaped units.

E-stop switch controls and gate switch controls have utilized series connections of the switches with or without safety monitoring control modules. Because of the direct series arrangement, this leads to masking (undetected) wire and/or switch faults when more than one switch is open at the same time.

The above scenarios illustrate that the control reliability of the machine safety control system is difficult to design into the system and maintain. Also, having safety control modules designed without a concerted effort toward system integration only makes the problem worse. Failure analysis of the machine safety control circuit is not always conducted correctly to account for failures such as wiring faults between safety control modules.

SUMMARY OF THE INVENTION

In accordance with the present invention, the above and other problems are solved by providing a methodology for implementing the interconnection of safety control modules in a control reliable manner. The methodology includes one or more safety control modules connected together so that the safety control modules communicate with each other using actively diverse safety control signals. The safety control modules are also connected to the machine safety control circuit so that the safety control modules can stop machine operation when one or more safety control modules are activated. The use of actively diverse safety control signals provides a control reliable system.

These and various other features as well as advantages, which characterize the present invention, will be apparent from a reading of the following detailed description and a review of the associated drawings.

DETAILED DESCRIPTION OF THE INVENTION

The invention may be described in the general context of different modules. These modules may be implemented in hardware circuitry or executed by one or more computers or other devices. Modules may include routines, programs, objects, components, data structures, etc. that perform particular tasks or implement particular abstract data types. Typically the functionality of the modules may be combined or distributed in desired various embodiments.

Figure 1:
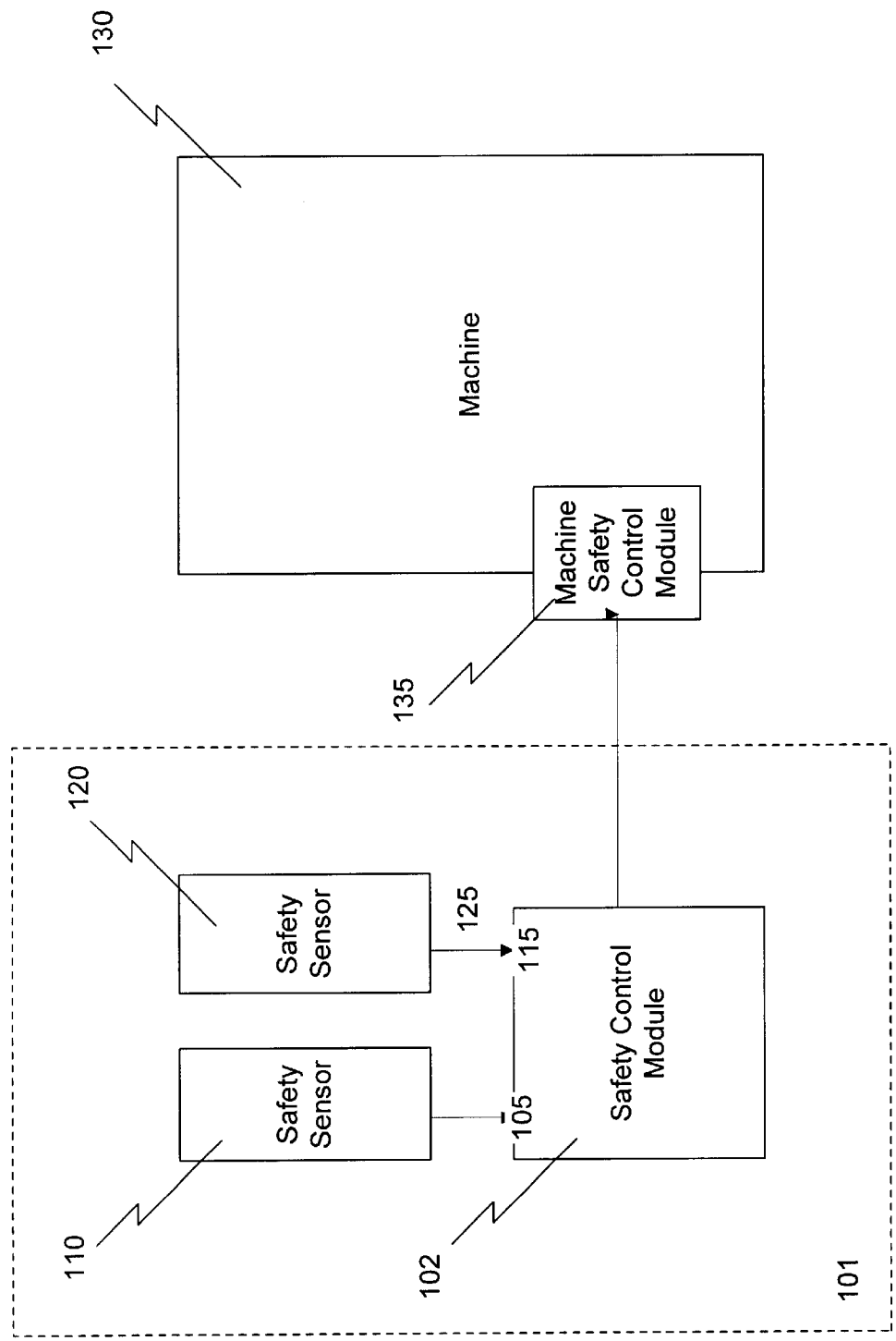
FIG. 1 shows a generic safety control module connected to a machine at the machine safety control circuit.

FIG. 1 illustrates one possible embodiment of a safety control system 101 used to provide perimeter safety to a user of a machine 130 according to the present invention. The safety control system 101 includes a safety control module 102 and one or more safety control sensors 110 and 120 in order to detect an unsafe operation condition for the machine 130. When such an unsafe condition is detected, the safety control system 101 takes appropriate steps, such as disabling the operation of the machine 130, to reduce any risk of injury to the user of the machine 130.

Machine 130 includes a machine safety control module 135. Safety control module 102 is connected to the machine safety control module 135 of machine 130 by connection 125. This connection 125 allows the safety control module 102 to communicate with the machine 130 through the safety control module 135. The safety control sensors 110 and 120 are adapted to interact with the machine operating environment and provide an indication of the machine operating environment to the safety control module 102 when predefined conditions in the machine operating environment are present.

Figure 2:
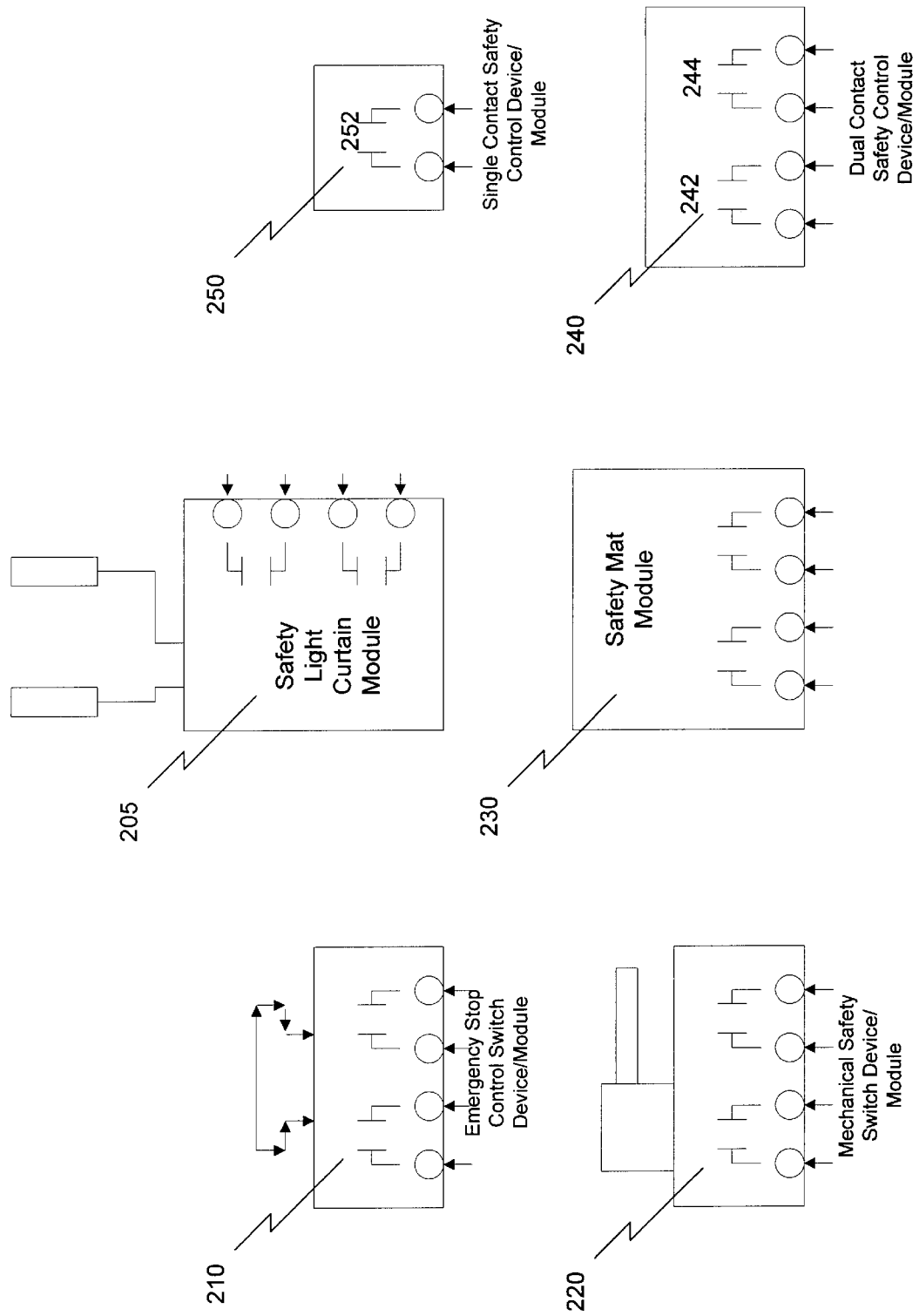
FIG. 2 illustrates different types of safety control devices and modules.

FIG. 2 shows embodiments of several different types of safety control devices and modules that may be used in a safety control system such as 101. The different safety control modules include safety light curtain module 205, electronic control switch device 210, mechanical safety switch device 220, and safety mat module 230. In addition, generic dual contact safety device/control module 240 is shown with contacts 242 and 244, as well as generic single contact safety control device/module 250 with single contact 252. A single contact module such as 250 is easily bypassed by a single wiring short across contact 252 and is therefore not control reliable. Dual contact versions provide a second channel to supply a safety control signal in the event of a single short of one of the output contacts 242 or 244. This works as long as the machine safety control module detects the shorted channel and does not allow the machine to continue to operate until the short is repaired. Otherwise, continued machine operation can lead to a second short across the other output contact. With both output contacts 242 and 244 bypassed, the safety control signals of the safety control module are muted and the machine will not stop.

The various embodiments of safety control devices/modules 205–250 may be implemented using a combination of hardware circuitry as well as software routines. The safety control devices/modules 205–250 are used within a safety control system 101 as illustrated in FIG. 1. A safety control system such as 101 can comprise of one or more of the safety control devices/modules shown in FIG. 2. Each of the safety control modules within a safety Control system can be connected to allow communication between each safety control module and the machine 130 shown in FIG. 1. Each safety control module can monitor the working environment and communicate with the machine when certain conditions in the working environment are present.

Figure 3:
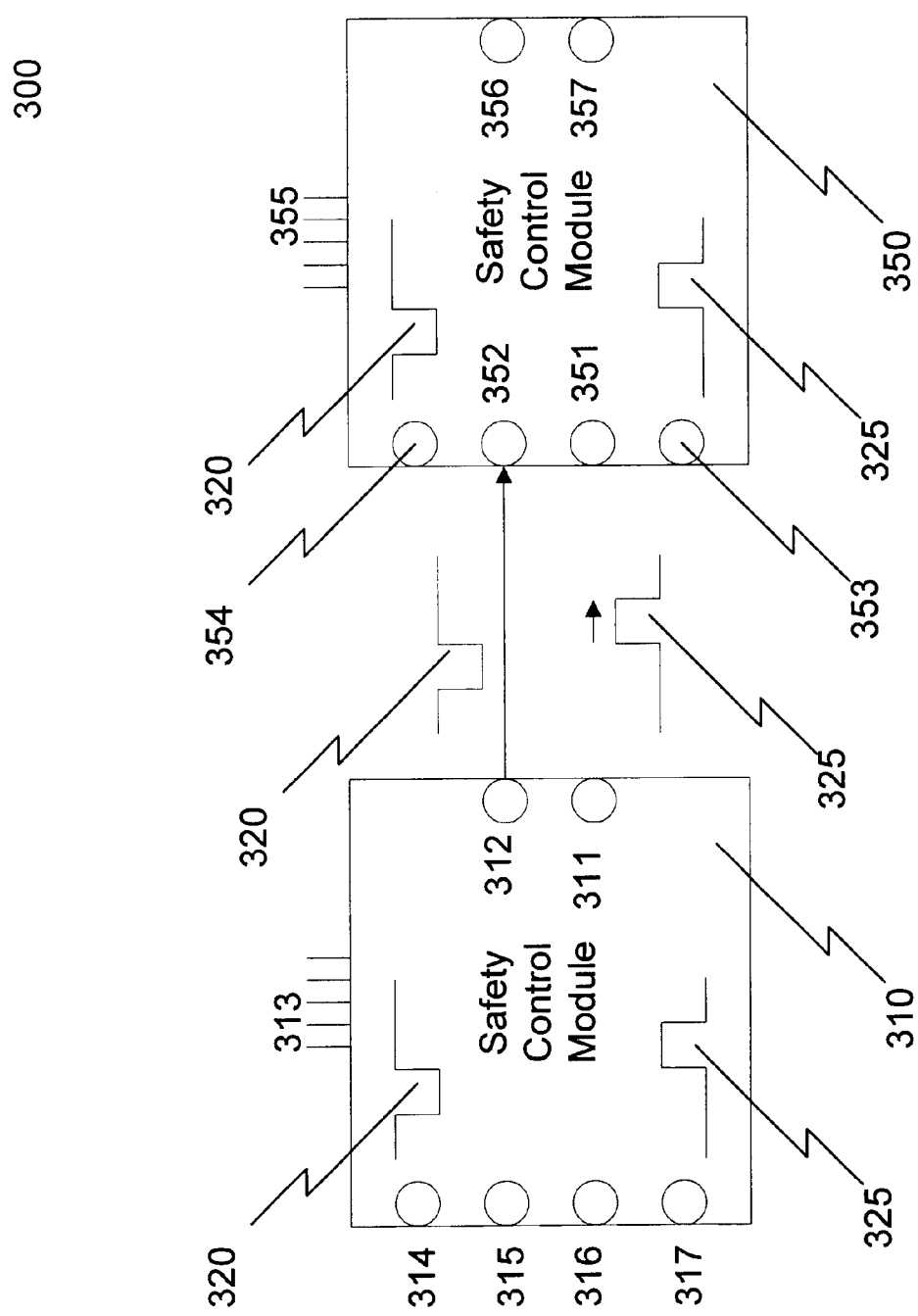
FIG. 3 shows two safety control modules connected in a control reliable manner as described in this present invention.

FIG. 3 shows the interconnection and signaling of two safety control modules 310 and 350 according to a sample embodiment of the present invention such that control reliability is maintained throughout system 300. The first safety control module 310 comprises input connection modules 315 and 316, output connection modules 311, 312 and 314, 317, and a plurality of terminal connection modules 313 that would be connected to one or more safety control sensors or devices. Output connection modules 311 and 312 of safety control module 310 are electrically connected to input connection modules 351 and 352 of the second safety control module 350. Other output connection modules 314, 317 as well as other input connection modules 315, 316 of the first safety control module 310 may be connected to other safety control devices or modules not shown in FIG. 3.

Actively diverse safety control signals 320 and 325 are communicated between outputs 311 and 312 to input connection modules 351 and 352 of safety control module 350. Actively diverse safety control signals are defined as signals that are generated in such a way as to differentiate them from other signals. Actively diverse safety control signals 320 and 325 may be generated by changing the state of these signals in a pre-defined way that differentiates the safety control signals from steady state signals (power or ground), other I/O signals, and extraneous electrical noise.

Pulsing the outputs creates an active signal. A pulse algorithm determines the signal definition. The safety control signal of a safety control module must be diverse in that each signal must have a unique definition. A unique definition of an actively diverse safety control signal may be accomplished by changing the one or more characteristics of the signal pulsing, including number of pulses, pulse width, time between pulses or a combination of all of these things, by changing the phase of the pulsing signals, by changing the circuit potential of the signals, or by a combination of any or all of these methods. Safety control modules must have input connection modules such as 351 and 352 that detect these pre-defined actively diverse safety control signals 320 and 325 and differentiate them from both other signals known signals and extraneous electrical noise present within a system.

Use of actively diverse safety control signals allows multiple safety control modules to be interconnected at an I/O module level as opposed to interconnecting them at the sensor/actuator level. By using a safety control signal output structure consisting of two or more actively diverse safety control signals and an input structure consisting of two or more actively diverse safety control signals, safety control modules may be connected together in a way that provides various safety functions, such as intrusion detection, guard removal, personnel detection, etc., in a control reliable way. Using this methodology, wiring faults such as an open or short to supply or other signal lines may be detected by the safety control modules that permits the machine to be shut down safely until the faults are repaired The preferred embodiment of this invention includes two redundant actively diverse signals that provide a control reliable system. However, other configurations such as a single channel, non-redundant, active signal may be used without departing from the spirit of the invention.

Figure 4:
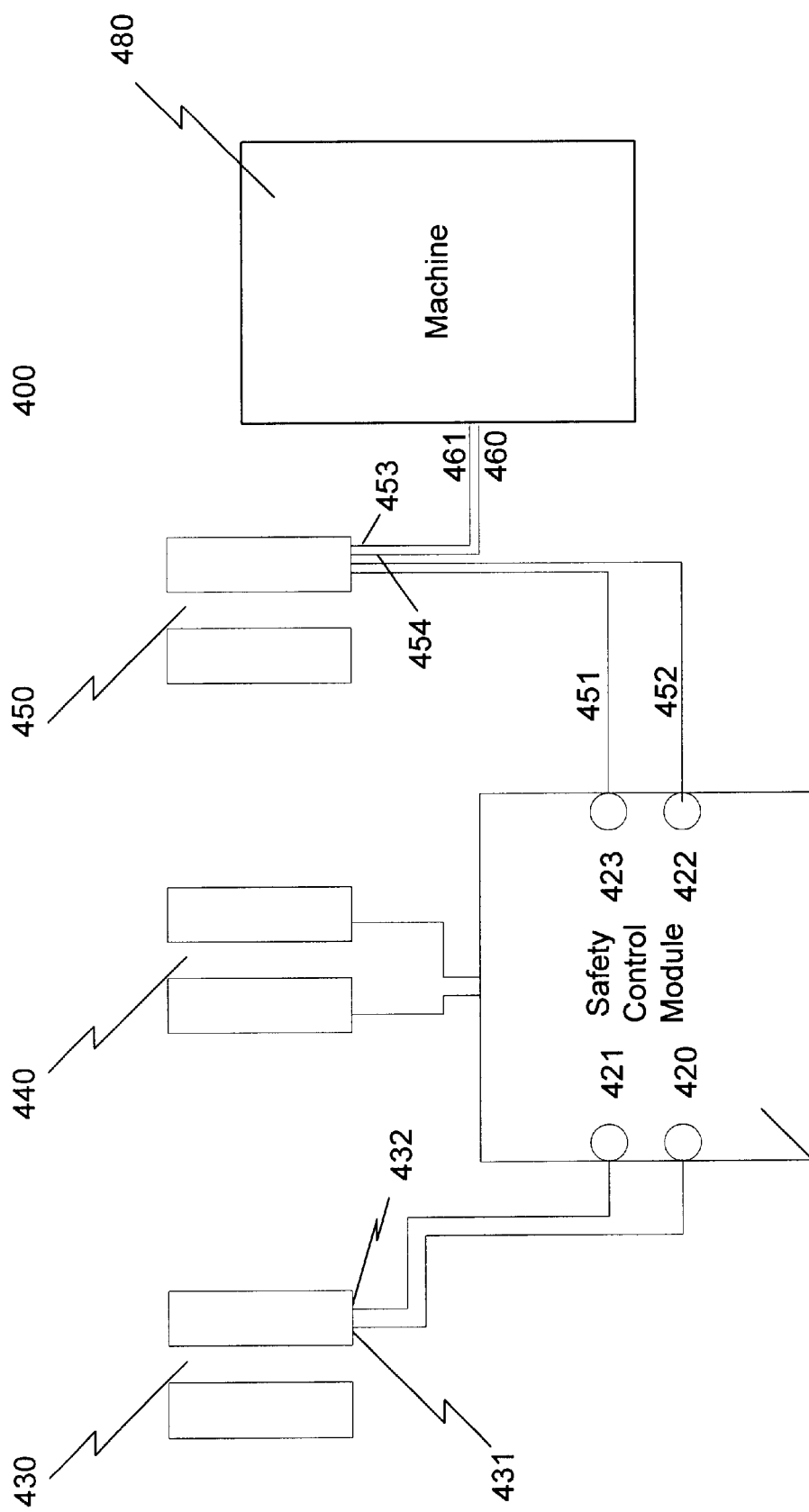
FIG. 4 shows multiple safety light curtain module connected in a control reliable manner as described in a first embodiment of the present invention.

FIG. 4 illustrates a machine 480 connected to a single safety control module incorporated within a safety control system 450 according to a first embodiment of the present invention. Safety control module 410 is provided as a safety light curtain module with safety light sensor 440. Output signals 431, 432 generated by the safety control sensor 430 are connected to input connections 420, 421 of safety control module 410. Output connections 422, 423 of the safety control module 410 are connected to input connections 451, 452 of the safety control system 450. Output signals 453, 454 generated by the safety control system 450 are connected to input connections 460, 461 of the machine safety control module of machine 480. Communication among safety control sensors 430, 440, 450, safety control module 410 and machine safety control module input 460, 461 is conducted using actively diverse safety control signals, thereby assuring control reliability.

If safety control sensors 430 or 440, detect a stop or alarm condition within the working environment, the sensor would communicate to safety control module 410. In turn, safety control module 410 would communicate with safety control system 450 and safety control system 450 would communicate with the machine safety control module of machine 480, stopping the machine or otherwise compensating for the alarm condition.

Figure 5:
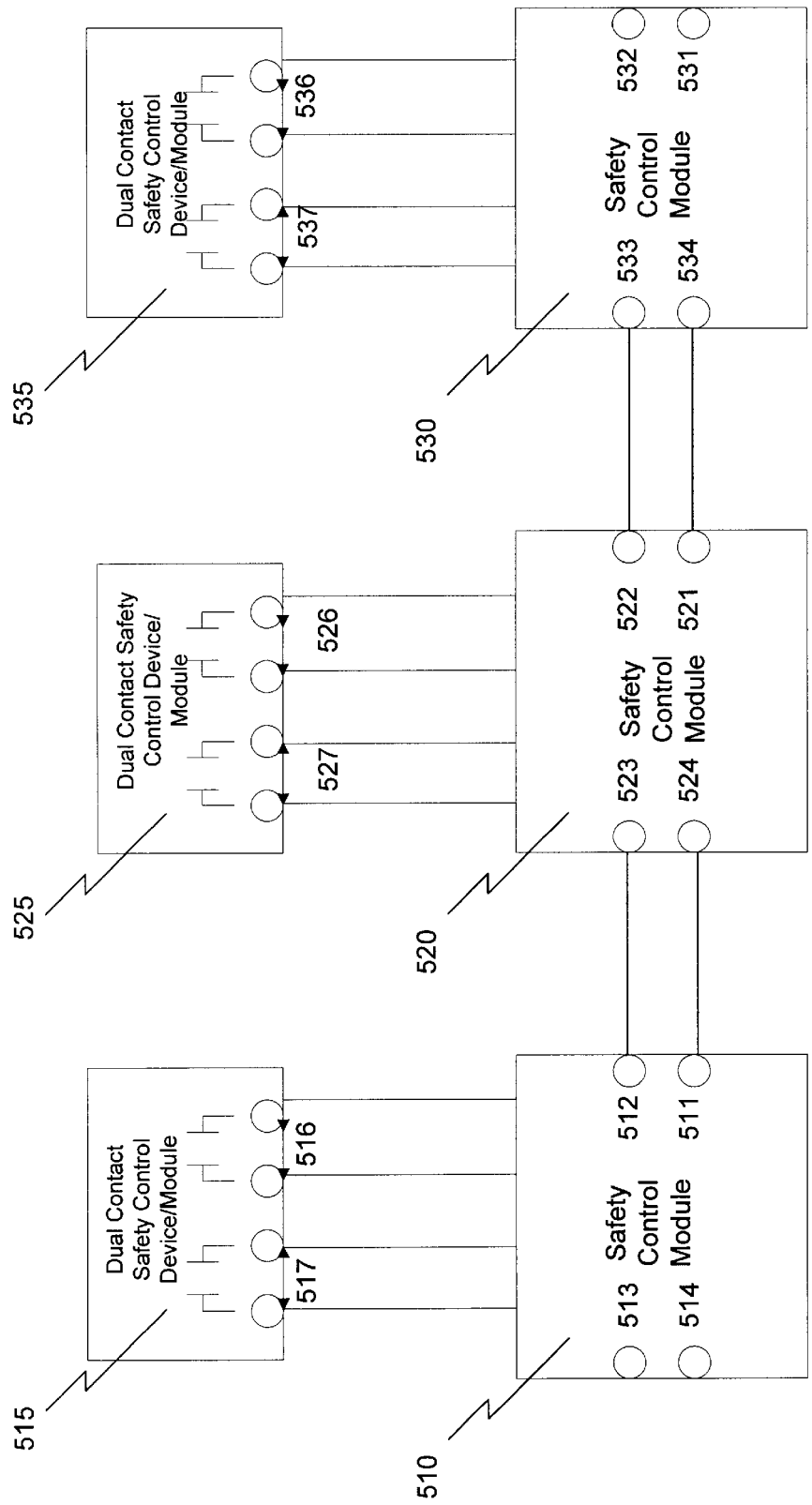
FIG. 5 illustrates multiple generic safety control modules connected in a control reliable manner as described in a second embodiment of the present invention.

FIG. 5 illustrates a machine connected to a plurality of safety control modules according to a second embodiment of the present invention. Safety control modules 510, 520, and 530 include generic dual contact safety control devices/modules 515, 525, and 535. Output connections 511, 512 of the first safety control module 510 are connected to input connections 523, 524 of the second safety control module 520. Output connections 521, 522 of the second safety control module 520 are in turn connected to input connections 533, 534 of the third safety control module 530. This interconnection of safety control modules may be extended to any number of connected modules. Communication between safety control modules 510, 520, and 530 is accomplished using actively diverse safety control signals, thereby assuring control reliability If dual contact safety control devices/modules 515, 525, or 535 detect a stop or alarm condition within the working environment, this condition would be communicated to safety control modules 510, 520, or 530 respectively. In turn, safety control modules 510, 520, and 530 would communicate the stop or alarm condition via outputs 531, 532. These outputs can be connected to another safety control module or a machine safety control module of a machine. Eventually the stop or alarm condition will be communicated to the machine safety control module, stopping the machine or otherwise compensating for the alarm condition.

Figure 6:
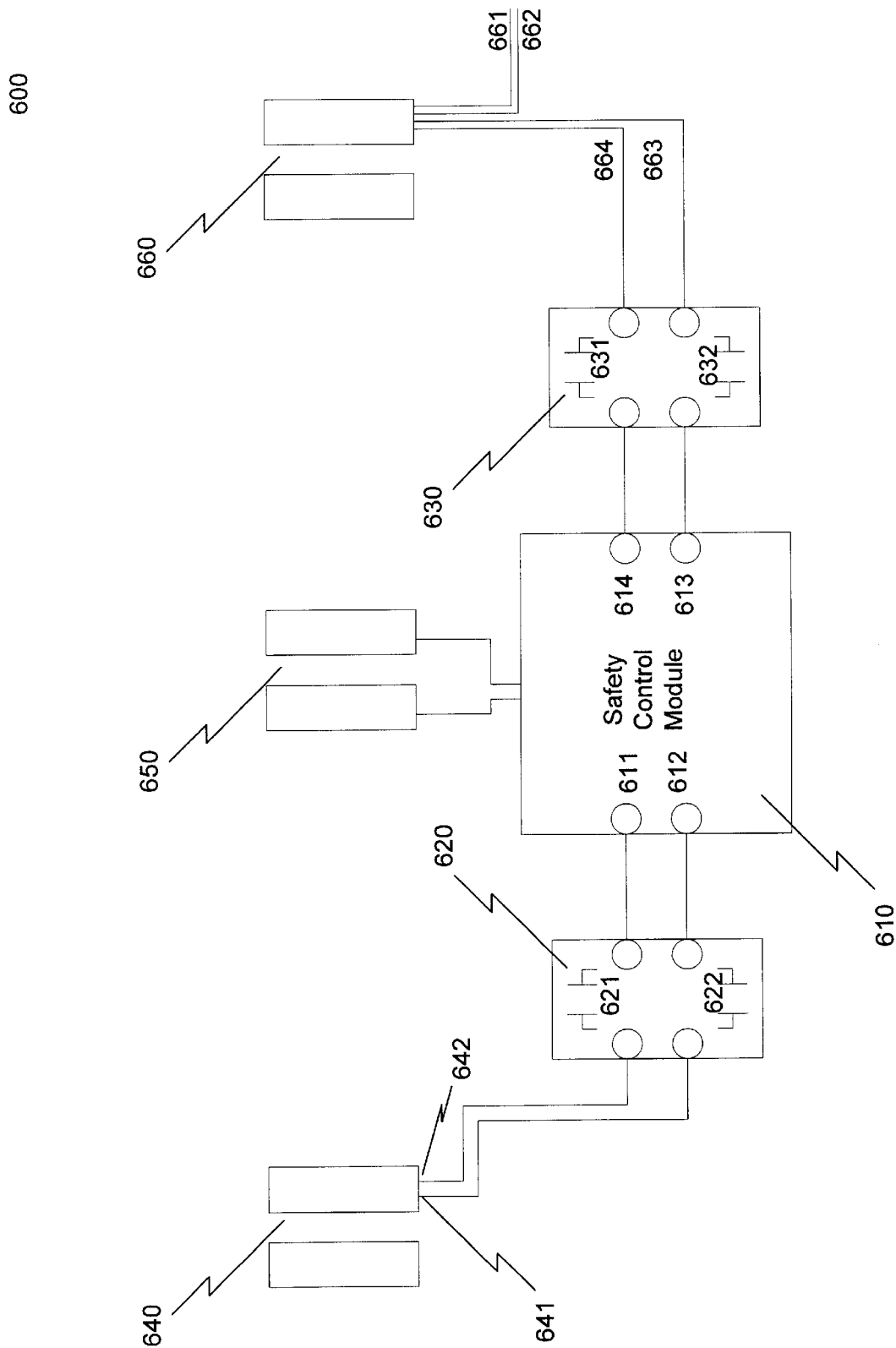
FIG. 6 illustrates multiple safety light curtain modules and generic safety control modules connected in a control reliable manner as described in a third embodiment of the present invention.

FIG. 6 illustrates a third embodiment of the present invention showing system 600 comprising mixed technology safety control sensors. System 600 includes safety control module 610, safety light curtain module sensors 640, 650, and 660, and generic safety control devices/modules 620 and 630. Safety light curtain module sensor 640 has outputs 641, 642 connected to contact 622 and 621 of generic safety control device/module 620. Contacts 621, 622 of safety control module 620 are connected to inputs 611, 612 of safety control module 610. Outputs 613, 614 of safety control module 610 are connected through contacts 631, 632 of generic safety control module 630, to inputs 663, 664 of safety light curtain module system 660. The outputs 661, 662 of safety light curtain module system 660 may be connected to a second safety control module or a machine safety control module not shown. The communications between the separate modules shown in system 600 are accomplished using actively diverse safety control signals, thereby assuring control reliability. Faults of output contracts and wiring of devices/modules 620 and 630 are detected and control reliability is maintained.

In all three embodiments shown in FIGS. 4, 5, and 6, the redundant actively diverse I/O methodology results in a common control reliable solution for multiple safety devices of similar or different safety functions.

Figure 7:
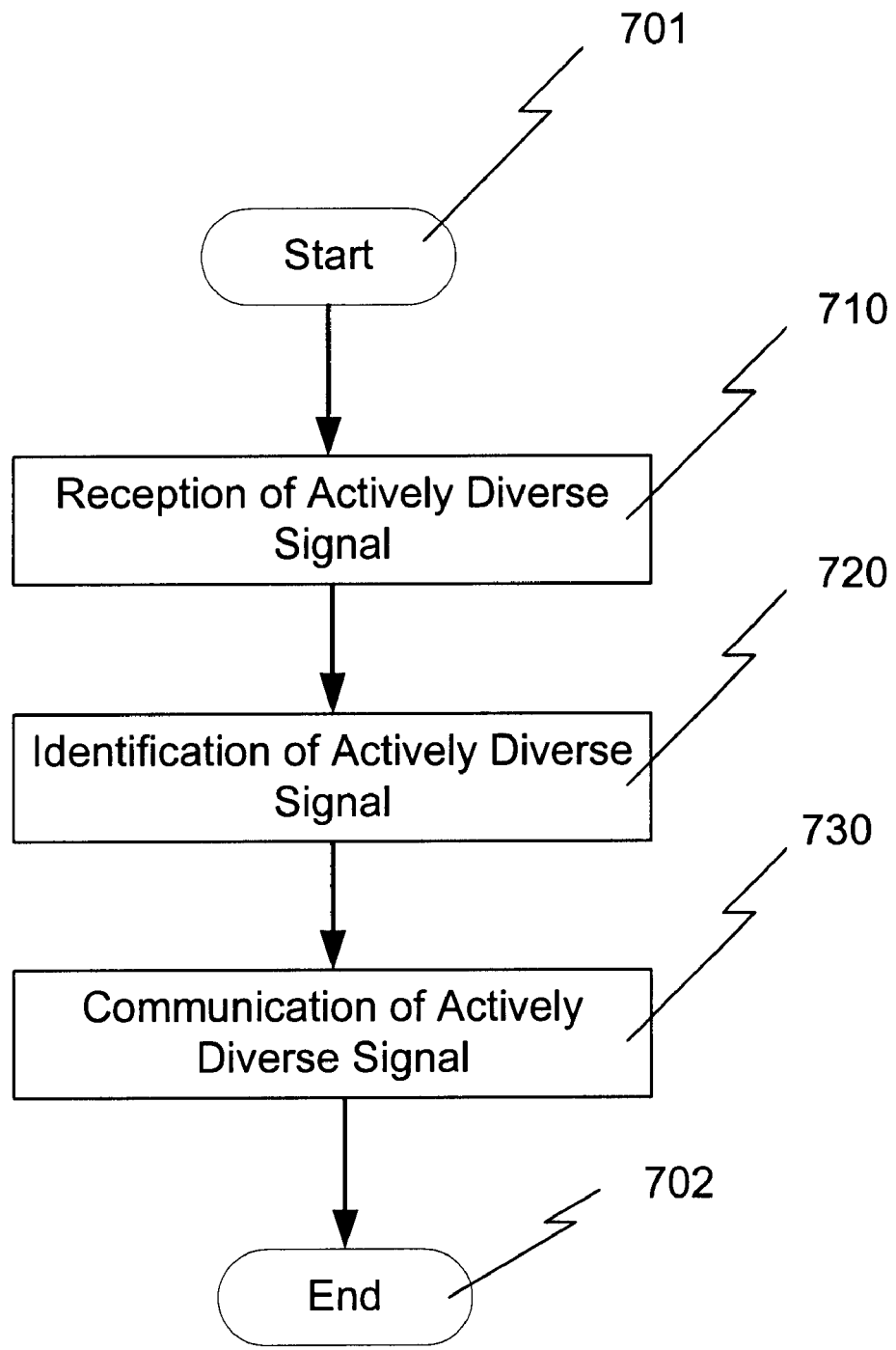
FIG. 7 illustrates the operational flow of a single safety control module.

FIG. 7 illustrates the operational flow for a single safety control module according to another embodiment of the present invention. Reception operator 710 receives actively diverse safety control signals from a safety control sensor or another safety control module. Identifier 720 then processes and recognizes the actively diverse safety control signals. Finally, communicator 730 sends the actively diverse safety control signals to the next module in the chain, which may include another safety control module or the machine safety control module of a machine.

Figure 8:
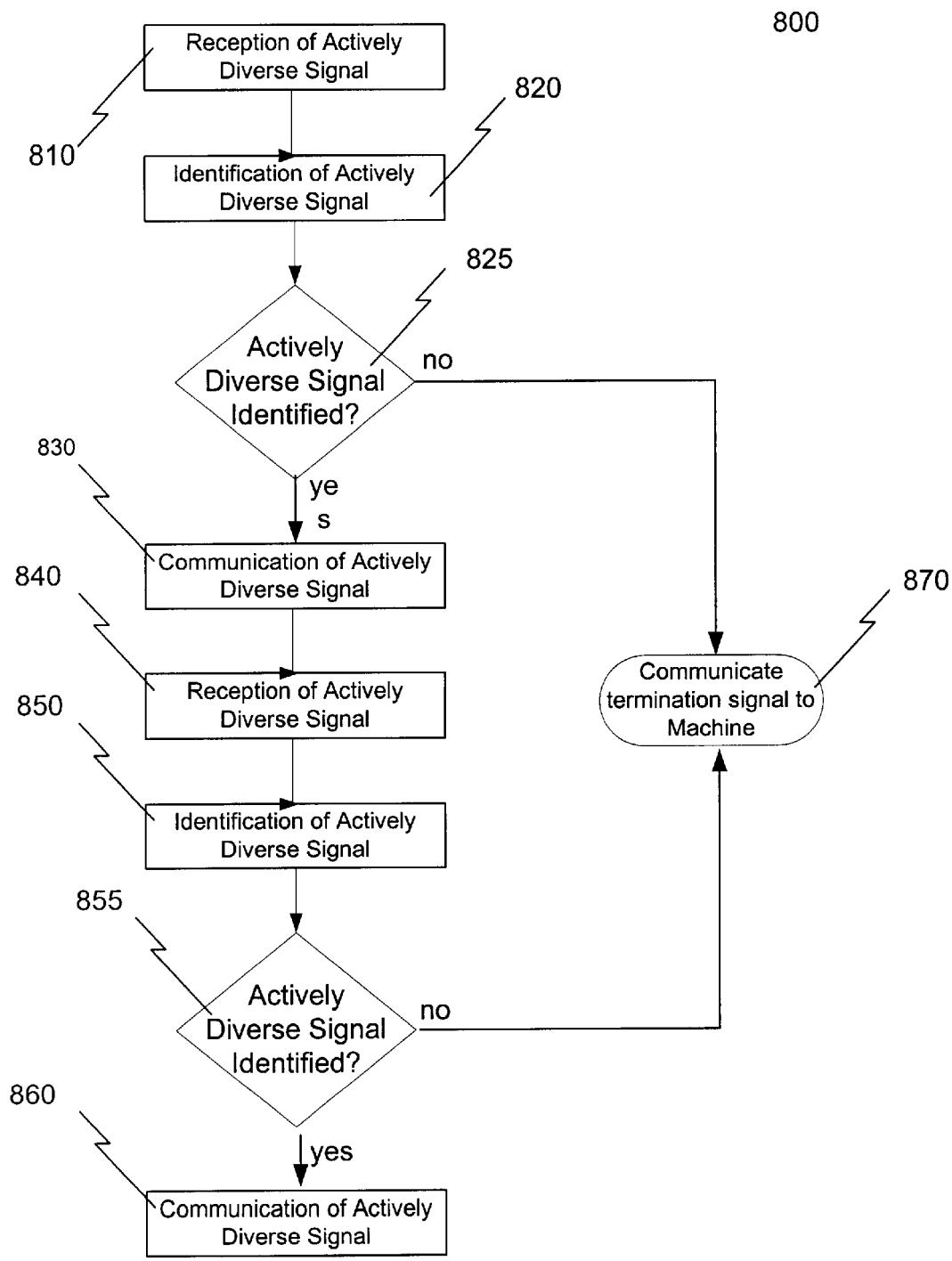
FIG. 8 illustrates the operational flow of two or more safety control modules.

FIG. 8 shows the operational flow for a machine safety control system 800 comprising two safety control modules. Reception operator 810 receives actively diverse safety control signals. Identifier 820 then processes and recognizes the actively diverse safety control signals. If the actively diverse safety control signals are not identified, detector 825 communicates to the machine to terminate operation, as shown in 870. If the actively diverse safety control signals are identified, communicator 830 sends the actively diverse safety control signals to reception operator 840 of the next safety control module. Reception operator 840, identifier 850, detector 855, and communicator 860 of the second safety control module function in a manner identical to the operators of the first safety control module.

It will be recognized by one skilled in the art that these operations, steps and modules described any of the above embodiments may be implemented in software, in firmware, in special purpose digital logic, and any combination thereof without deviating from the spirit and scope of the present invention as recited within the claims attached hereto. While the invention has been particularly shown and described with reference to preferred embodiments thereof, it will be understood by those skilled in the art that various other changes in the form and details may be made therein without departing form the spirit and scope of the invention.

What is claimed is:

1. A safety control module for constructing control reliable machine safety control system, the safety control module comprising:

a first and second input terminals used to receive and identify two first actively diverse safety control signals; and a first and second output terminals used to communicate two second actively diverse safety control signals according to a pulse signal definition;

wherein the first and second output terminals generate the two or more second actively diverse safety control signals when the safety control module receives the two or more first actively diverse safety control signals and determines a safety stop condition does not exist.

2. The safety control module according to claim 1, wherein the safety control module further comprises:

a third and fourth output terminals used to generate two third actively diverse safety control signals, the two third actively diverse safety control signals correspond to the two first actively diverse safety signals expected to be received at the first and second input terminals.

3. The safety control module according to claim 2, wherein the two second actively diverse safety control signals correspond to the two first actively diverse safety control signals on a second safety control module.

4. The safety control module according to claim 3, wherein the second safety control module includes a hybrid mixture of different types of the safety control modules.

5. The safety control module according to claim 2, wherein the first and second actively diverse safety control signals are generated by changing a manner of pulsing the first and second actively diverse safety control signals.

6. The safety control module according to claim 2, wherein the first and second actively diverse safety control signals are generated by changing a phase of the first and second actively diverse safety control signals.

7. The safety control module according to claim 2, wherein the first and second actively diverse safety control signals are generated by changing a circuit potential of the first and second actively diverse safety control signals.

8. The safety control module according to claim 2, wherein the first and second actively diverse safety control signals are generated by changing a combination of a manner of pulsing, phase, and circuit potential of the first and second actively diverse safety control signals.

9. The safety control module according to claim 2, wherein the outputs of a first safety control module are connected to the inputs of a safety control system, with the outputs of the safety control system being connected to the inputs of a second safety control module.

10. A method for providing a control reliable interconnection between various safety control modules, the method comprising:

receiving at least two first actively diverse safety control signals at least one input terminal of a first safety control module;

identifying the actively diverse safety control signals; determining whether a safety stop condition exists using the at least two actively diverse safety control signals; and transmitting at least two second actively diverse safety control signals from least one output terminal of the first safety control module to a second safety control module;

wherein the at least two second actively diverse safety control signals are generated when the safety control module receives the two first actively diverse safety control signals.

11. The method according to claim 10, wherein the method further comprises generating two third actively diverse safety control signals, the two third actively diverse safety control signals correspond to the two first actively diverse safety signals expected to be received at the input terminal.

12. The method according to claim 11, wherein the method further comprises:

connecting the two third actively diverse safety control signals to the two first actively diverse control signals through a safety input switch; the safety input switch permits the two third actively diverse safety control signals to be communicated to the two first actively diverse safety control signals when the safety input switch is closed.

13. The method according to claim 12, wherein the first and second actively diverse safety control signals are generated by changing a circuit potential of the first and second actively diverse safety control signals.

14. The method according to claim 12, wherein the first and second actively safety signals generated changing a combination of a manner of pulsing, phase, and circuit potential of the first and second actively diverse safety control signals.

15. The method according to claim 11, wherein the first and second actively diverse safety control signals are generated by changing a manner of pulsing the first and second actively diverse safety control signals.

16. The method according to claim 11, wherein the first and second actively diverse safety control signals are generated by changing a phase of the first and second actively diverse safety control signals.

* * * * *